United States Patent
Jeong et al.

(10) Patent No.: US 6,842,475 B2
(45) Date of Patent: Jan. 11, 2005

(54) APPARATUS FOR ACQUISITION OF ASYNCHRONOUS WIDEBAND DS/CDMA SIGNAL

(75) Inventors: Yeon-kyoon Jeong, Seoul (KR); Kwang-bok Lee, Seoul (KR); Ji-yong Chun, Seoul (KR); Ki-ho Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 822 days.

(21) Appl. No.: 09/736,195

(22) Filed: Dec. 15, 2000

(65) Prior Publication Data

US 2001/0014086 A1 Aug. 16, 2001

(30) Foreign Application Priority Data

Dec. 15, 1999 (KR) .......................................... 1999-57989

(51) Int. Cl.[7] .................... H04B 1/713; H04B 7/216; H04B 7/212
(52) U.S. Cl. .................... 375/130; 370/335; 370/348
(58) Field of Search ................................ 370/335, 348; 375/130, 146, 147

(56) References Cited

U.S. PATENT DOCUMENTS

| | | | | |
|---|---|---|---|---|
| 5,910,948 A | * | 6/1999 | Shou et al. | 370/335 |
| 5,914,943 A | * | 6/1999 | Higuchi et al. | 370/320 |
| 5,930,366 A | * | 7/1999 | Jamal et al. | 370/509 |
| 6,167,037 A | * | 12/2000 | Higuchi et al. | 370/335 |
| 6,226,315 B1 | * | 5/2001 | Sriram et al. | 375/140 |
| 6,269,088 B1 | * | 7/2001 | Masui et al. | 370/335 |
| 6,272,168 B1 | * | 8/2001 | Lomp et al. | 375/222 |

FOREIGN PATENT DOCUMENTS

| EP | 0 884 856 A3 | 12/1998 |
|---|---|---|
| EP | 0 884 856 A2 | 12/1998 |

* cited by examiner

*Primary Examiner*—Stephen Chin
*Assistant Examiner*—Cicely Ware
(74) *Attorney, Agent, or Firm*—Lee & Sterba, P.C.

(57) ABSTRACT

An apparatus for acquisition of an asynchronous wideband direct-sequence/code division multiple access signal, which acquires a long code from a direct-sequence/code division multiple access control channel signal, in which a common short code, and the long code are transmitted within one frame, and a group identification code indicating a code group, to which a base station belongs, are combined and transmitted with the common short code, includes: a long code masking correlation portion; a differentially coherent combining portion; a code group and frame timing acquisition portion; and a long code acquisition portion for acquiring the long code by correlating the long codes belonging to the acquired code group and the received long code, respectively.

6 Claims, 5 Drawing Sheets

APPARATUS FOR ACQUISITION OF ASYNCHRONOUS WIDEBAND DS/CDMA SIGNAL

BACKGROUND OF THE INVENTION

1. Field of the Invention

The present invention relates to an apparatus for acquisition of an asynchronous, wideband DS/CDMA signal.

2. Description of the Related Art

An asynchronous, wideband, direct-sequence/code division multiple access (DS/CDMA) system is one of the next generation of mobile communication systems suggested in Japan and Europe. An asynchronous, wideband DS/CDMA system has an advantage that external timing information is not required, which is different from other DS/CDMA systems. In a conventional DS/CDMA system, the acquisition of code must precede the demodulation of data, however, in the case of an asynchronous system, base stations use different codes, so that it takes more time for the acquisition than in a synchronous system.

The asynchronous, wideband DS/CDMA system is a system that identifies channels or users by using a spreading code, so that its transmitter transmits signals of the modulated data multiplied by the spreading code. In the asynchronous, wideband DS/CDMA system, in order for a mobile terminal to demodulate the data transmitted from the base station, it must be preceded by an acquisition process. In a synchronous system such as the IS-95, which is now commonly used, all the base stations use the same codes and each base station is identified by a different offset, so that an acquisition process means a process for searching for the offset of the code used in the base station to which the mobile terminal belongs.

If the acquisition is not achieved, it is impossible to estimate the phases of channels. Therefore, generally a noncoherent detector, which can discriminate whether acquisition is achieved or not regardless of the phases of channels, is used in the acquisition process. FIG. 1 is a block diagram of a noncoherent detector. The noncoherent detector according to FIG. 1 includes an antenna 100, a local oscillator (LO) 102, a mixer 104, a correlator 106, a square multiplier 108, and a discriminator 110.

The operation according to the above structure is as follows. The antenna 100 receives a high frequency signal that has experienced fading and additive noise through radio channels. The mixer 104 multiplies the received signals by a signal produced in the local oscillator 102 and changes the received signal into a complex signal of base band. The correlator 106 correlates a real component and an imaginary component of the complex signal, respectively. The square multiplier 108 squares the correlated signal and removes a phase component induced by the channels. The discriminator 110 decides whether acquisition is achieved or not by discriminating the output values of the square multiplier 108.

The correlator 106 can be an active correlator or a matched filter correlator. An active correlator performs a correlation by multiplying codes generated by an internal code generator by the received signal and then by integrating the multiplied values over a correlation interval. Realization of the active correlator is relatively simple but the acquisition time thereof is long. The matched filter correlator has an advantage in that it takes a shorter time for acquisition than the active correlator, since the matched filter correlator can test different phases at every chip time.

FIGS. 2(a) through 2(e) illustrate the correlation results of the matched filter correlator for the case where acquisition is achieved and for the case where acquisition is not achieved, when the power of the received signal is 1 and ideal channels having no noise and fading are assumed. Symbol $r_k$ illustrates samples of the received signal at each tap of the matched filter. Symbol $c_k$ illustrates tap coefficients of the matched filter, and symbol $p_k$ illustrates the product of $r_k$ and $c_k$.

FIG. 2(a) illustrates $c_k$, the tap coefficients of the matched filter. FIG. 2(b) illustrates $r_k$, the samples of the received signals when acquisition is achieved (in-sync), and FIG. 2(c) illustrates $p_k$, the results of multiplying the values illustrated in FIGS. 2(a) and 2(b). According to these figures, if acquisition is achieved, all the $p_k$ values become 1 and the output value of the matched filter become 1.

FIG. 2(d) illustrates $r_k$, the samples of the received signals when acquisition is not achieved (out-of-sync), and FIG. 2(e) illustrates $p_k$, the results of multiplying the values illustrated in FIGS. 2(a) and 2(d). According to these figures, if acquisition is not achieved, the $p_k$ values become 1 or −1, and the sum thereof becomes much smaller than 1. In fact, due to the fading and additive noise of the channels, each of the output values of the matched filter becomes a complex number, and the outputs of the matched filter in the in-sync case can be smaller than the outputs of the matched filter in the out-of-sync case, which can result in a false lock.

In addition, if a signal-to-noise ratio is low, or the signal components are attenuated by the fading, it is impossible to make a reliable decision on whether acquisition is achieved or not only with the outputs of the matched filter of the received signal for the predetermined interval. Therefore, it can be more reliable to decide by combining the outputs of the matched filter obtained repeating for the above interval.

As a method for combining the outputs of the matched filters, there is a coherent combination method or a noncoherent combination method. The coherent combination method continuously accumulates the outputs of the matched filter during L intervals (where L is a positive integer), and then, squares the accumulated result and decides whether acquisition is achieved. However, performance of the coherent combination method is rapidly degraded if the fading or the offset of the frequency increases to more than a threshold value. The noncoherent combination method squares the outputs of the matched filter during the L intervals and linearly combines them to decide whether acquisition is achieved or not. That is, the output of the noncoherent combination method becomes the sum of the outputs of the noncoherent detector. However, performance of the noncoherent combination method is seriously degraded if the signal-to-noise ratio (SNR) worsens.

SUMMARY OF THE INVENTION

To solve the above problems, it is a feature of an embodiment of the present invention to provide an apparatus that achieves signal acquisition of an asynchronous, wideband direct-sequence/code division multiple access (DS/CDMA) signal, which decides whether acquisition is achieved or not by differentially coherently combining the i-th and the (i-1)-th outputs of a matched filter during the L intervals.

It is another feature of an embodiment of the present invention to provide an apparatus for acquisition, which acquires a long code from a direct-sequence/code division multiple access (DS/CDMA) control channel signal, in which a common short code and the long code are transmitted within one frame, and a group identification code indicating a code group to which a base station belongs, are combined and transmitted with the common short code. The apparatus for acquisition includes: a long code masking correlation portion for correlating common short codes generated internally and the control channel signal; a differentially coherent combining portion for deciding whether acquisition of the common short code is achieved or not by multiplying a complex conjugate value of previous output of the long code masking correlation portion by present output of the long code masking correlation portion, and by accumulating the results of multiplication during the predetermined times and by taking an absolute value of the accumulated value; a code group and frame timing acquisition portion for acquiring the code group and frame timing by correlating each group identification code, which can be generated according to the coherence of the common short code, and the received group identification codes respectively, and by combining each correlation result; and a long code acquisition portion for acquiring the long code by correlating long codes belonging to the acquired code groups and the received long code respectively.

It is an additional feature of an embodiment of the present invention to provide an apparatus for acquisition, which acquires a long code from a direct-sequence/code division multiple access control channel signal, in which a common short code, and the long code are transmitted within one frame, and a group identification code indicating a code group to which a base station belongs, are combined and transmitted with the common short code. The apparatus for acquisition includes: a long code masking correlation portion for correlating common short codes generated internally and the control channel signal; a switch for connecting each output of the long code masking correlation portion to output terminals which exist as many as the number of the common short code, and repeating this process; a differentially coherent combining portion for deciding whether acquisition of the common short code is achieved or not, by comparing values output from a means wherein the means delays a value input from the output terminal connected to the switch for a predetermined time, takes a complex conjugate of the delayed value, multiplies the complex conjugated value by the value input from the output terminal, accumulates the multiplied value for a predetermined times, and takes an absolute value of the accumulated value; a code group and frame timing acquisition portion for acquiring the code group and frame timing by correlating each group identification code which can be generated according to the coherence of the common short code, and the received group identification codes respectively, and by combining each correlation result; and a long code acquisition portion for acquiring the long code by correlating the long codes belonging to the acquired code group and the received long code respectively.

These and other features and advantages of the present invention will be readily apparent to those skilled in the art upon review of the detailed description that follows.

BRIEF DESCRIPTION OF THE DRAWINGS

The above features and advantages of the present invention will become more apparent by describing in detail a preferred embodiment thereof with reference to the attached drawings in which.

DETAILED DESCRIPTION OF PREFERRED EMBODIMENTS

Korean patent application number 99-57989, filed on Dec. 15, 1999, and entitled: "Apparatus of Acquisition of Asynchronous Wideband DS/CDMA Signal," is incorporated by reference herein in its entirety.

Figure 1:
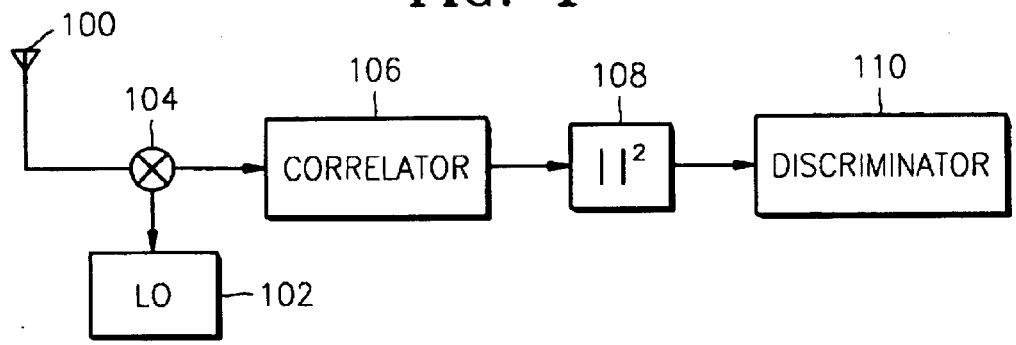
FIG. 1 illustrates a block diagram of a noncoherent detector.
Figure 2:
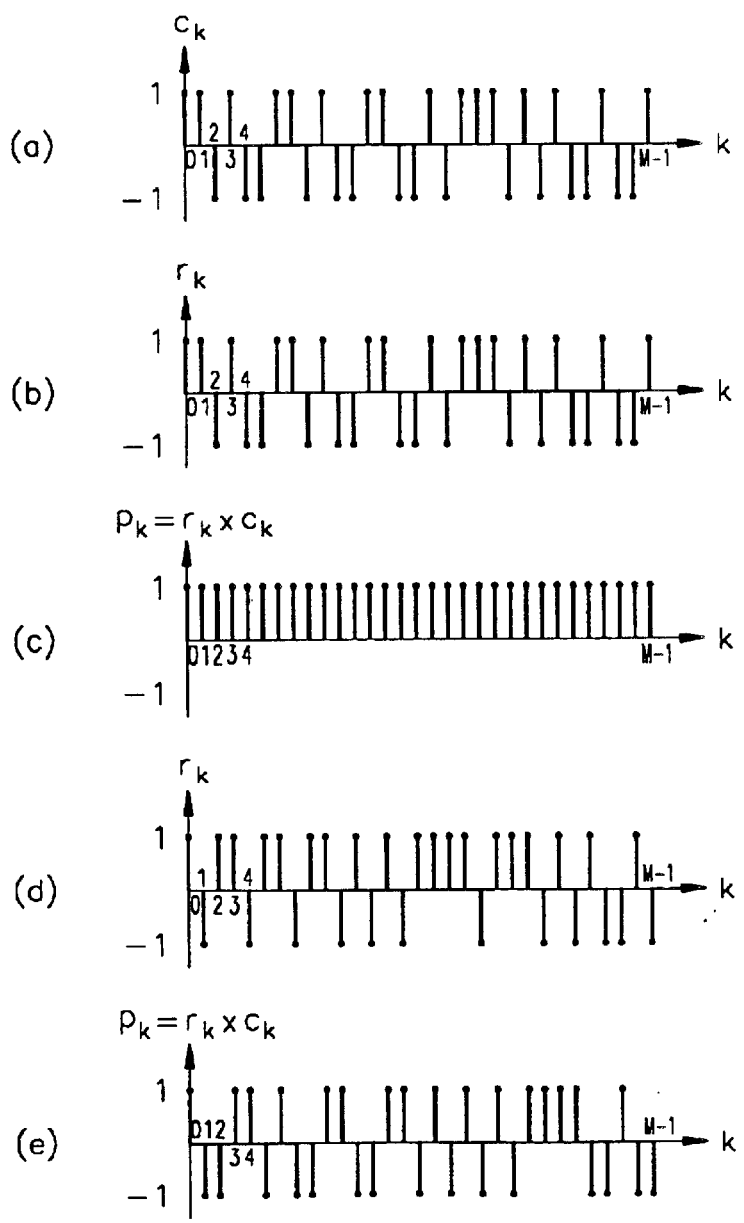
FIGS. 2(a) through 2(e) illustrate correlation results of a matched filter correlator for the case where an acquisition is achieved and for the opposite case where a power of received signal is 1, with ideal channels having no noise and fading.
Figure 3:
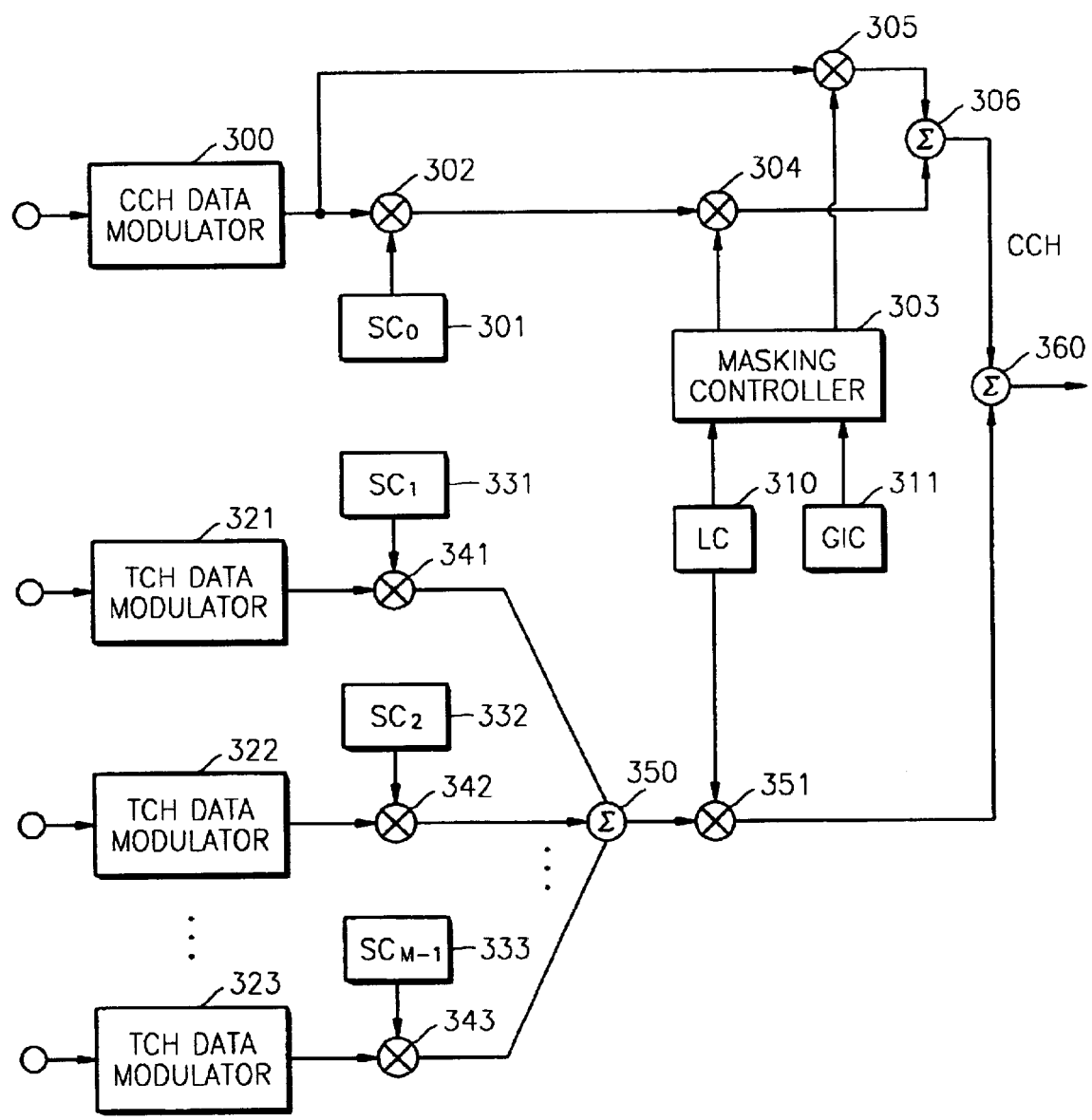
FIG. 3 illustrates a block diagram of an asynchronous, wideband direct-sequence/code division multiple access system transmitter which produces control channel and traffic channel.

FIG. 3 is a block diagram illustrating an asynchronous wideband DS/CDMA system transmitter that produces a control channel (CCH) and a traffic channel (TCH). The transmitter in FIG. 3 includes a CCH data modulator 300, a first short code generator ($SC_0$) 301, a first multiplier 302, a masking controller 303, a second multiplier 304, a third multiplier 305, a first adder 306, a long code generator (LC) 310, a group identification code generator (GIC) 311, TCH data modulators 321 through 323, short code generators ($SC_1$, $SC_2$, $SC_{M-1}$) 331 through 333, multipliers 341 through 343, a second adder 350, a third multiplier 351, and a third adder 360.

The CCH data modulator 300 and the TCH data modulators 321 through 323 modulate respectively the input CCH data and TCH data. The first short code generator 301 and the short code generators 331 through 333 generate M short codes (SC) (where M is a positive integer), and among the SCs, $SC_0$ is used for the CCHs, and $SC_1$ through $SC_{M-1}$ are used for identifying the TCH respectively. The SCs are common to all base stations, and are orthogonal to each other. Here, M is the same as a processing gain, the number of chips multiplied per data symbol, and one period of the SC is equivalent to one symbol interval. That is, a chip time is 1/M of the symbol interval. Long codes (LC) generated from the long code generator 310 are unique to each base station and used for identifying a base station. The GIC generated from the GIC generator 311 is a SC for identifying code groups to which a base station belongs, and the W LC sequences form one code group (where W is the total number of LS sequences).

The first multiplier 302 multiplies the $SC_0$ generated by the first short code generator 301 by the output of the CCH data modulator 300. The masking control portion 303 controls the masking of the predetermined intervals of the outputs of the CCH data modulator 300 and the first multiplier 302 from the outputs of the long code generator 310 and the GIC generator 311, and the second and the third multipliers 304 and 305 perform masking according to the control of the masking controller 303. The first adder 306 adds up the outputs of the second and the third multipliers 304 and 305, and then outputs the added result as a CCH.

The multipliers 341 through 343 multiply each output of the TCH data modulators 321 through 323 by each output of the short code generators 331 through 333 respectively, and the second adder 350 adds up the outputs of the multipliers 341 through 343. The third multiplier 351 multiplies the output of the second adder 350 by the output of the long code generator 310, and the outputs the added result as a TCH. The third adder 360 adds the CCH to the TCH and transmits the result.

The mobile terminal uses a CCH signal transmitted from a base station for acquisition. The CCH signal has a form that the LC inherent to a base station is masked periodically for an MTc (Tc: chip time), a period of the SC. Thus, the SC only appears for the MTc and the LC only appears for the rest. That is, the SC and the LC are time-multiplexed and transmitted.

Figure 4:
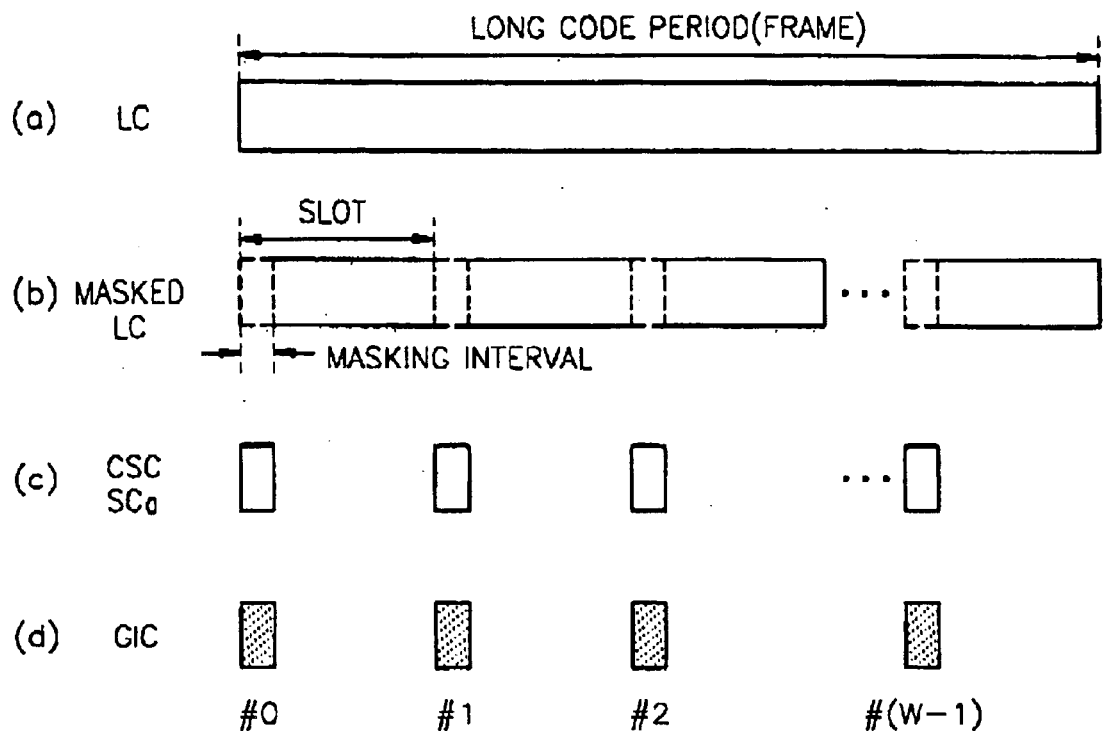
FIGS. 4(a) through 4(d) illustrate a pattern of a CCH signal made by the direct-sequence/code division multiple access of FIG. 3.

FIGS. 4(a) through 4(d) illustrate the CCH signal pattern made in FIG. 3. FIG. 4(a) illustrates the LC period of one frame. FIG. 4(b) is the LC formed of L slots, and the length of each slot is NTc. At each slot, the LC is masked for one period (MTc) of the SC. In the masking section, the SC is formed of the sum of two codes, which are orthogonal to each other. One of the two codes is a common short code (CSC) such as $SC_0$ shown in FIG. 4(c), and the other code is a GIC shown in FIG. 4(d).

Figure 5:
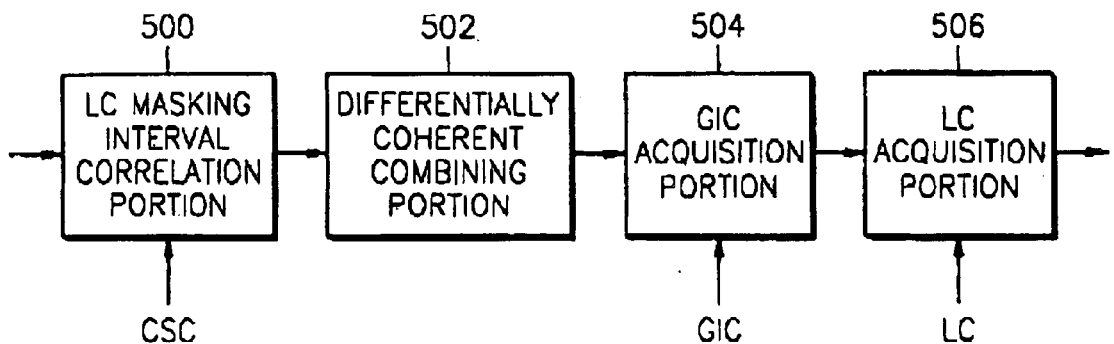
FIG. 5 is a block diagram of an apparatus for acquisition of a wideband DS/CDMA signal according to the present invention.

FIG. 5 is a block diagram that illustrates the apparatus for acquisition of wideband DS/CDMA signals according to the present invention. The apparatus for acquisition according to FIG. 5 includes an LC masking interval correlation portion 500, a differentially coherent combining portion 502, a GIC acquisition portion 504, and an LC acquisition portion 506.

The LC masking interval correlation portion 500 correlates the CSC generated within the receiver and the received signal. The differentially coherent combining portion 502 combines differentially coherently the correlation results of the LC masking interval correlation portion 500, and decides whether slot acquisition is achieved or not. The GIC acquisition portion 504 correlates the GIC and the LC masking interval, and combines the results of the matched filtering for one or more frames and chooses the GIC having the biggest combination result. The chosen GIC is determined to be the code group of the base station to which a mobile terminal belongs, and at the same time frame acquisition is achieved. The LC acquisition portion 506 match-filters W LCs, which belongs to the code group obtained in the GIC acquisition portion 504 and the other sections except the LC masking interval and chooses the LC having the biggest match-filtered result.

Figure 6:
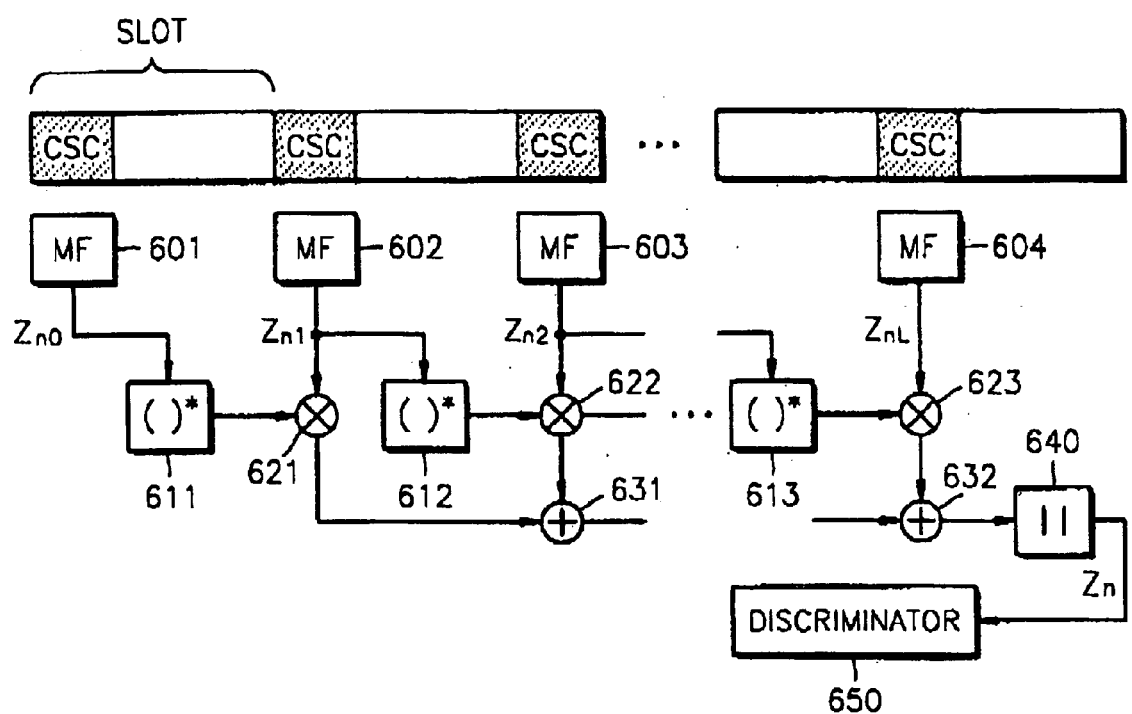
FIG. 6 is a detailed block diagram of an LC masking interval correlation portion and a differentially coherent combining portion shown in FIG. 5.

FIG. 6 is a block diagram that illustrates the operation of the LC masking interval correlation portion 500 and the differentially coherent combining portion 502 performed during the predetermined slot section. According to FIG. 6, the LC masking interval correlation portion includes correlators (MF) 601 through 604, and the differentially coherent combing portion includes conjugators 611 through 613, multipliers 621 through 623, adders 631 and 632, an absolute value calculator 640, and a discriminator 650.

The correlators 601 through 604 correlate the received signal and the CSCs. Here, the correlators 601 through 604 are matched filters. The matched filters include M tabs, and the tab coefficients are the CSCs. The matched filters produce one output at every chip time.

The conjugators 611 through 613 output the complex conjugate values of the outputs of each of the matched filter 601 thorough 604. The multipliers 621 through 623 multiply the complex conjugate outputs of the previous slots by the correlator outputs of the present slots. Each of the adders 631 and 632 adds up the outputs of the multipliers 621 through 623 outputted at every chip time. The absolute value calculator 640 takes the absolute value of the final results of the adding up, and the discriminator 650 detects the LC masking interval by choosing the time when the absolute value becomes the biggest.

The block diagram shown in FIG. 6 assumes that there are a plurality of correlators (MF) 601 through 604, a plurality of conjugators 611 through 613, a plurality of multipliers 621 through 623, and a plurality of adders 631 and 632 in order to explain briefly the operations performed during the predetermined slot. However, in fact, a correlator, a conjugator, a multiplier, and an adder perform the operations sequentially at every chip time.

Figure 7:
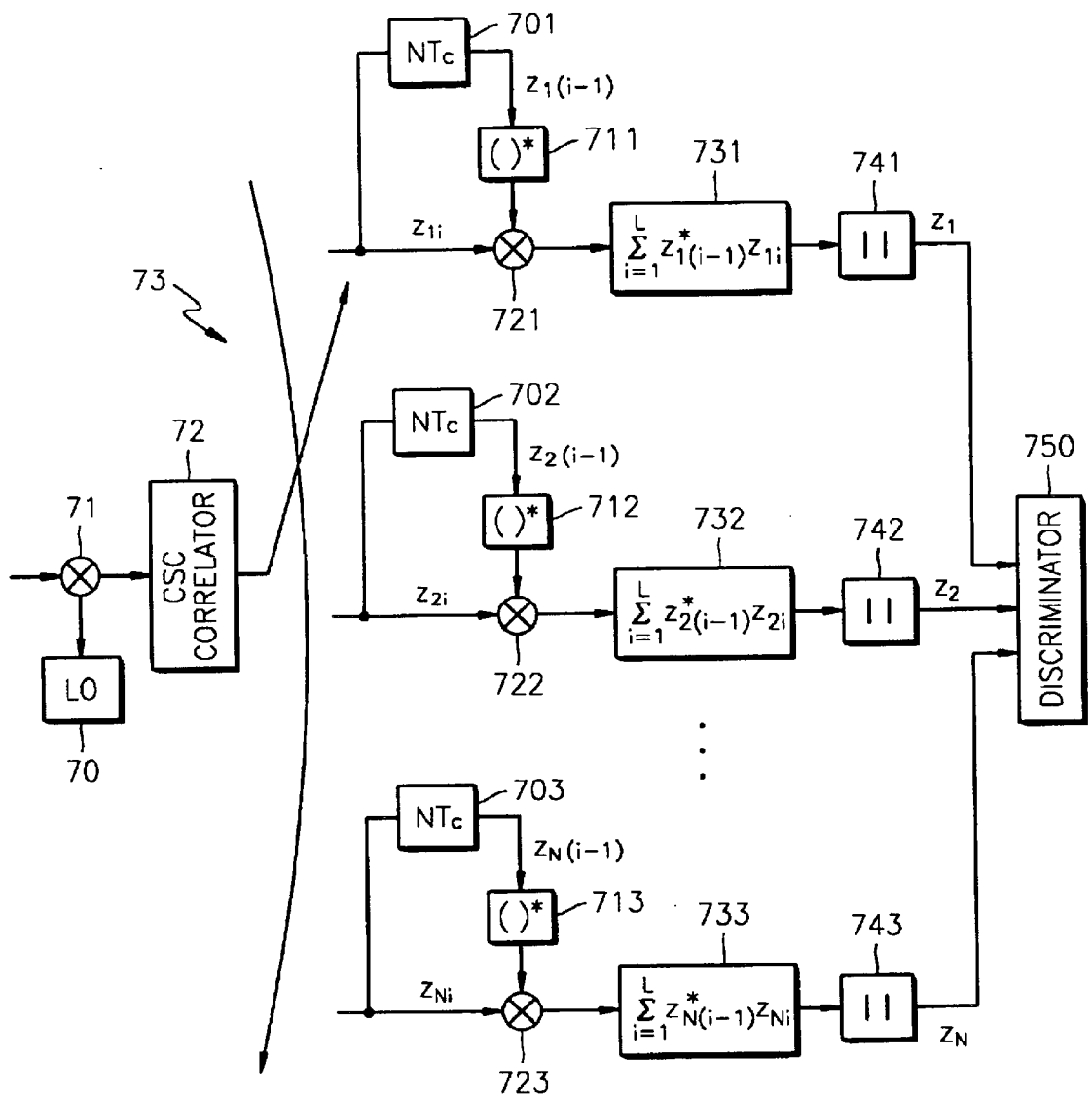
FIG. 7 is another preferred embodiment of the LC masking interval correlation portion and the differentially coherent combining portion shown in FIG. 6.

FIG. 7 is another preferred embodiment of the LC masking interval correlation portion 500 and the differentially coherent combining portion 502 shown in FIG. 6.

According to FIG. 7, the LC masking interval correlation portion is formed of a CSC correlator 72, and the differentially coherent combining portion includes a switch 73, delays 701 through 703, complex conjugators 711 through 713, multipliers 721 through 723, adders 731 through 733, absolute value calculators 741 through 743, and a discriminator 750. Reference numeral 70 indicates a local oscillator (LO) and reference numeral 71 indicates a converter 71 that converts received signal into base band signals by multiplying received signal by signal generated in the local oscillator 70.

The operation is as follows. The CSC correlator 72 is a matched filter, and the matched filter coefficients are the CSC. The matched filter outputs identical code phase with period of a slot (NTc) at every chip time. Therefore, it can be decided whether acquisition is achieved or not by storing the matched filter outputs corresponding to each of the N different code phases in a memory (not shown) and differentially coherently combining values stored in memory for L slots and accumulating them and then taking the absolute value on the accumulated result. The acquisition decision value ($Z_n$) of the n-th code phase in the LC masking interval of each slot is obtained as follows. First, each delay 701 through 703 delays each value passing through the switch 73 for the Ntc, a duration of one slot. Each complex conjugator 711 through 713 takes the complex conjugate of the outputs of each delay 701 through 703. Each multiplier 721 through 723 multiplies signal passing through the switch 73 at the present chip time by outputs of the complex conjugators 711 through 713 respectively. That is, the n-th output complex conjugate of the CSC correlator 72 is multiplied by the N+n-th output of the CSC correlator 72, the N+n-th output complex conjugate of the CSC correlator 72 is multiplied by the 2N+n-th output of the CSC correlator 72, . . . , the (L−1)N+n-th output complex conjugate of the CSC correlator 72 is multiplied by the (L)N+n-th output of the CSC correlator 72. As a result, $(Z_{n0}{}^{\star}Z_{n1})$, $(Z_{n1}{}^{\star}Z_{n2})$ . . . , $(Z_{n(L-1)}{}^{\star}Z_{nL})$ are output. Each adder 731 through 733 accumulates the same number of outputs of the multipliers 721 through 723 as the number of L slots. Each of absolute value calculators 741 through 743 takes the absolute value of each of the accumulated values. The discriminator 750 chooses a code phase corresponding to the biggest value among the decision values of the number N ($Z_n$: n=1, 2, . . . , N), and decides whether acquisition is achieved. If the decision is wrong, the above process is repeated. The matched filter outputs for the L+1 slots are required in order to obtain N decision values. However, after the second decision, the matched filter outputs of the last slot used for the previous decision can be used, so that the matched filter outputs of only the L slots are required. For the differentially coherent combination, the 2N memories for storing N matched filter outputs and N accumulated values are required. Also, the L complex conjugating means and the multiplying means are required, and the L−1 adding means are required.

The differentially coherent combining means of the present invention has a higher reliability of the decision values as the number of combined slots increases. However, the acquisition receiver becomes more complicated and it takes longer to obtain a decision value. Therefore, the number of combined slots should be chosen properly, reflecting the acquisition time and complexity.

Although the present invention is explained only with the examples of the differentially coherent combination, the combining method adopting both the coherent combination and the differentially coherent combination can be used. That is, the decision value can be obtained by coherently combining combined results and the slots which are not so much influenced by fading and frequency offset and accumulating the coherently differentially coherent combining the accumulated results. Here, the number of total slots is a product of the number of slots coherently combined and the number of slots differentially coherently combined.

According to an embodiment of the present invention, first, since the differentially coherent combining outputs of the matching filters on various slots obtain a decision value having a big combination profit comparing with the asynchronous combination, and a decision of higher reliability can be given, a time for acquisition can be reduced. Second, if there is a frequency offset, a coherent combination attenuates signal components of a decision value, and a time for acquisition is increased, so that an influence of the frequency offset can be reduced through a differentially coherent detection. Third, after the combination, an influence of a fading and a frequency offset can be reduced by catching all signal energy dispersed into a real component and an imaginary component by fading and frequency offset. Fourth, it can be used for not only an asynchronous DS/CDMA system but also a synchronous DS/CDMA system or an acquisition of a system using a pilot signal.

While the present invention has been described in terms of preferred embodiments, those of ordinary skill in the art will recognize that various modifications may be made to the invention without departing from the spirit and scope thereof.

What is claimed is:

1. An apparatus for acquisition of a direct-sequence/code division multiple access signal, which acquires a long code from a direct-sequence/code division multiple access control channel signal, in which a common short code and the long code are transmitted within one frame, and a group identification code indicating a code group, to which a base station belongs, are combined and transmitted with the common short code comprising:

a long code masking correlation portion for correlating common short codes generated internally and the control channel signal;

a differentially coherent combining portion for deciding whether acquisition of the common short code is achieved or not by multiplying a complex conjugate value of a previous output of the long code masking correlation portion by a present output of the long code masking correlation portion, by accumulating the results of multiplication during a predetermined time and by taking an absolute value of the accumulated value;

a code group and frame timing acquisition portion for acquiring the code group and frame timing by correlating each group identification code, which can be generated according to a coherence of the common short code output from the differentially coherent combining portion, and the received group identification codes respectively, and by combining each correlation result; and a long code acquisition portion for acquiring the long code by correlating the long codes belonging to the acquired code group and the received long code respectively.

2. The apparatus of claim 1, wherein the long code masking correlation portion is a matched filter correlator comprising a plurality of taps whose tap coefficients are the common short codes generated internally.

3. The apparatus of claim 2, wherein the differentially coherent combining portion comprises:

a complex conjugator for taking the complex conjugate of the output of the matched filter correlator;

a multiplier for multiplying the previous output of the complex conjugator by the present output of the long code masking correlation portion;

an accumulator for accumulating the outputs of the multiplier;

an absolute value calculator for taking the absolute value of the outputs of the accumulator; and a discriminator for deciding whether acquisition of the common short, code is achieved or not from the outputs of the absolute value calculator.

4. An apparatus for acquisition for a direct-sequence/code division multiple access signal, which acquires a long code from a direct-sequence/code division multiple access control channel signal, in which a common short code and the long code are transmitted within one frame, and a group identification code indicating a code group, to which a base station belongs, are combined and transmitted with the common short codes comprise:

a long code masking correlation portion for correlating common short codes generated internally and the control channel signal;

a switch for connecting each output of the long code masking correlation portion to output terminals which exist as many as the number of chips of the common short code, and repeating this process;

a differentially coherent combining portion for deciding whether acquisition of the common short code is achieved or not, by comparing values output from a means for delaying a value input from the output terminal connected to the switch for a predetermined time, for taking a complex conjugate of the delayed value, for multiplying the complex conjugated value by the value input from the output terminal, for accumulating the multiplied value for a predetermined time and takes an absolute value of the accumulated value;

a code group and frame timing acquisition portion for acquiring the code group and frame timing by correlating each group identification code, which can be generated according to a coherence of the common short code output form the differentially coherent combining portion, and the received group identification codes respectively, and by combining each correlation result; and a long code acquisition portion for acquiring the long code by correlating the long codes belonging to the acquired code groups and the received long code respectively.

5. The apparatus of claim 4, wherein the long code masking correlation portion is a matched filter correlator comprising a plurality of taps whose tap coefficients are the common short codes generated internally.

6. The apparatus of claim 4, wherein the differentially coherent combining portion comprises:

a plurality of delays which delay the value input from the output terminal connected to the switch for the duration of the slot;

a plurality of complex conjugators which take the complex conjugate of the outputs of each delayer;

a plurality of multipliers which multiply the output of each complex conjugator by the value inputted from the output terminal;

a plurality of accumulators which accumulate the output of each multiplier;

a plurality of absolute value calculators which take the absolute value of the output of each accumulator; and a discriminator which decides whether acquisition of the common short code is achieved or not, comparing the outputs of the absolute value calculators.

\* \* \* \* \*